3,373,149
POLYMERS OF ALLO-OCIMENE DIEPOXIDE AND AMMONIA AND THEIR PRODUCTION
William C. Doyle, Jr., Fairway, Kans., assignor to Tenneco Chemicals, Inc., a corporation of Delaware
No Drawing. Filed Nov. 19, 1964, Ser. No. 412,331
11 Claims. (Cl. 260—83.3)

ABSTRACT OF THE DISCLOSURE

The present invention relates to copolymers, and their production, of allo-ocimene diepoxide and ammonia containing recurring amino groups and recurring divalent, open-epoxy ring hydroxylated allo-ocimene diepoxide groups. A major portion of the recurring groups are secondary amino groups. Essentially, the reaction to form the copolymers involves reacting from 0.8 to 1.2 moles of ammonia with one mole of the diepoxide under superatmospheric pressure with the initial pressure being at least 50 pounds per square inch gauge at a temperature at least initially above 75° C. The primary reaction involved is:

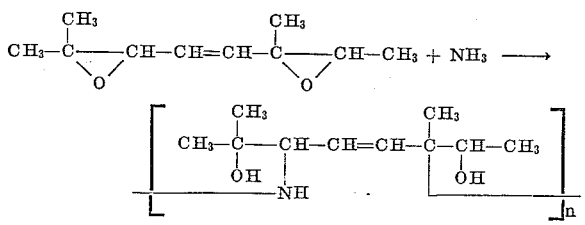

in which $n$ has a greater value than 2. As the epoxy groups may open in either direction the hydroxyl group shown on the 2 carbon atom may be on the 3 carbon atom and the hydroxyl group shown on the 7 carbon atom may be on the 6 carbon atom. There may be some cross-linking through the oxygen or nitrogen atoms.

---

The present invention realtes to the production of polymeric resinous materials from allo-ocimene diepoxide and ammonia, the novel resin so produced, and the use of such resins in paper coatings.

It has been found that allo-ocimene diepoxide and ammonia can be reacted at elevated temperatures under superatmospheric pressure to form polymers containing recurring amino groups and recurring groups of open-epoxy ring hydroxylated allo-ocimene diepoxide. These resins may vary from soft to hard, brittle products and may be used for coating paper, either alone or in combination with other paper-coating materials, or may be used for other purposes.

Allo-ocimene diepoxide may be represented by the general structural formula

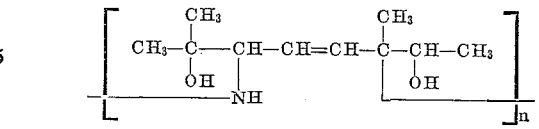

which includes the various optical isomers. It is known that two moles of ammonia may be reacted with both epoxy groups in one mole of allo-ocimene diepoxide to form dihydroxy diamines.

Surprisingly, it has been found that allo-ocimene diepoxide and ammonia may be reacted in substantially equimolar quantities to produce polymers consistent with the following general formula

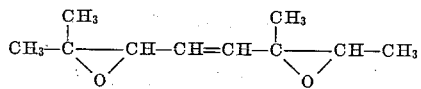

in which $n$ has an average value greater than 2. The two epoxy groups or rings in the formula of the diepoxide may open in either direction so that the relative positions of the adjacent C—O and C—N bonds may be reversed in the above formula with a hydroxyl (—OH) group being on each of the 3 and 6 carbon atoms instead of being on the 2 and 7 carbon atoms as shown. There may be some cross-linking through oxygen or nitrogen atoms. Some cross-linking through a nitrogen atom is indicated by the presence of a small amount of tertiary amino groups in the polymer. As shown in the above formula, the present polymer contains recurring divalent, 2,6-dimethyl octylene-4 groups containing on the average two hydroxyl groups.

The relative proportions of the reactants and the reaction conditions may be varied within a limited range. The ammonia and allo-ocimene diepoxide react in about a 1:1 mole ratio. This mole ratio may be varied slightly and from 0.8 to 1.2 moles of ammonia may be used. Larger amounts of ammonia tend to cause the formation of monomeric, dihydroxy diamines. Smaller amounts of ammonia may be used but cause a reduction in yield of polymer.

While it is possible to react ammonia to a limited extent at atmospheric pressure to form a low molecular weight polymer, such a reaction requires many days and results in a very low yield of a soft resin. Accordingly, it is preferred that the reaction be carried out under superatmospheric pressure and preferably under a pressure above 50 pounds per square inch gauge. When the reaction is carried out in a closed vessel, the pressure is a function of the temperature and preferably the temperature is above 75° C. during at least part of the reaction. As the reaction proceeds the pressure at a given temperature will tend to drop as the monomers polymerize, and the pressure may be allowed to drop below 50 pounds per square inch gauge. Higher pressures and temperatures may be used. However, temperatures and the accompanying high pressures should not be used which will cause charring or breakdown of the reactants, particularly the allo-ocimene diepoxide.

Preferably, but not essentially, the ammonia is used in the form of aqueous ammonia. However, this is not essential and allo-ocimene diepoxide and ammonia gas may be charged to the pressure reaction vessel and agitated to promote contact with each other.

The allo-ocimene diepoxide which is used may be in a pure or relatively crude form. The allo-ocimene peroxide product prepared as described in U.S. Patent No. 3,038,906, J. H. Stump, Jr., et al., which contains allo-ocimene diepoxide may be used as a starting material in practicing the present invention. Alternatively, an allo-ocimene dioxide product containing impurities may be distilled and a center cut taken to obtain allo-ocimene diepoxide which is relatively free from such impurities. Allo-ocimene diepoxide is disclosed in Naves et al., Chem. Abs. 51 (1957), p. 17833C.

Example 1

There was placed in a stainless steel rocking pressure vessel of 1380 ml. capacity, 380 g. (2.26 moles) of allo-ocimene diepoxide (essentially pure $C_{10}H_{16}O_2$) and 137 g. of 28% aqueous ammonia (2.26 moles $NH_3$). Agitation (rocking) and heating were begun. The temperature was raised to 98° C. during the next 2¼ hours while the internal pressure of the system rose to 80 p.s.i.g. At this point the pressure began dropping slowly and fell to 55 p.s.i.g. in a 4-hour period during which time the temperature of the mixture rose to 129° C. and then dropped back to 107° C. as the reaction exotherm subsided. After cooling overnight, the vessel was opened (no NH₃ odor detectable) and the water was decanted. The product, a viscous oil, was dissolved in chloroform, washed with water and the solvent evaporated. The residue was stripped at 10 mm. pressure absolute to a pot temperature of 150° C. and 117 g. of volatile material (containing little, if any, unreacted allo-ocimene diepoxide) was condensed. The residue (294 g., 70% yield) was a brittle resin having the following characteristics.

| | |
|---|---|
| Melting point (capillary) ° C | 50-55 |
| Color (on rosin scale) | F |
| Molecular weight | 690 |
| Percent N | 5.0 |
| Amine determination: | |
|    Primary amino N percent | 1.26 |
|    Secondary amino N do | 2.38 |
|    Tertiary amino N do | 0.56 |

Soluble in dilute HCl, insoluble in water.

The infrared spectrum showed absorption characteristic of OH, NH, and carbon-carbon unsaturation.

The molecular weight of the resin produced in accordance with Example 1 corresponds to an average value of about 4 for $n$ in the previously mentioned formula for the resin. It is also to be noted that a major portion of the recurring amino groups are secondary amino groups. The primary amino groups may be present in terminal groups of the polymer. Preferably, the resin produced in this manner should have a molecular weight in the range of from about 200 to 1200.

*Example 2*

Several attempts were made to react equimolar amounts of allo-ocimene diepoxide and ammonia at atmospheric pressure. In the most successful of these, a mixture of 570 g. (3.4 moles) of allo-ocimene diepoxide and 210 g. of 28% aqueous ammonia (3.4 moles of NH₃) was stirred at 40°–45° C. for 63 hours. At the end of this time the organic layer was separated and distilled at 10 mm. pressure to a pot temperature of 195° C. leaving as residue 116 g. (18.5% yield) of a dark, soft resin. The recovered volatile material was predominately unreacted allo-ocimene diepoxide.

*Example 3*

Sheets of commercial Butcher-Wrap paper sized with a rosin soap were dipped into dilute acetone solutions of the polymer produced as described in Example 1. Ten samples were dipped in each of three solutions containing 0.5%, 1.0%, and 1.5% by weight of polymer, respectively. In addition, 10 sheets were dipped in plain acetone and 10 sheets were retained as blanks. Half of each batch of 10 sheets was placed in an oven at 135° C. for two minutes and then all were subjected to the well-known Ink Flotation test. In this well-known test pieces of paper (boats) are floated felt-side up in a level bath of blue-black ink. The results are expressed as the length of time elapsing until one-half of the sheet is penetrated by ink. The results are summarized in the following table:

| Treatment | Ink Flotation Time Average 5 Tests (minutes) | |
|---|---|---|
| | Oven Treated | Not Oven Treated |
| Blank | 24 | 11 |
| Acetone Blank | 22 | 11 |
| 0.5% Acetone Solution | 41 | 13 |
| 1.0% Acetone Solution | 39 | ¹5 |
| 1.5% Acetone Solution | 24 | ¹5 |

¹ Seconds.

What is claimed is:
1. A copolymer resin of from 0.8 to 1.2 moles of ammonia and one mole of allo-ocimene diepoxide.
2. A copolymer resin of equimolar amounts of ammonia and allo-ocimene diepoxide.
3. An allo-ocimene diepoxide–ammonia resin essentially composed of polymers consistent with the following general formula:

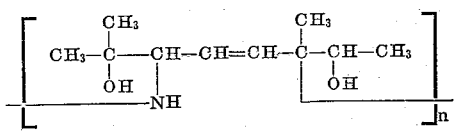

in which $n$ has an average value greater than 2.

4. An allo-ocimene diepoxide–ammonia resin essentially composed of polymers consistent with the following general formula:

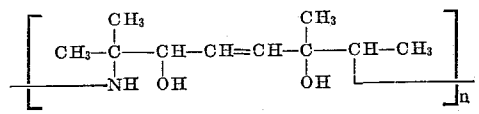

in which $n$ has an average value greater than 2.

5. An allo-ocimene diepoxide–ammonia copolymer resin of from 0.8 to 1.2 moles of ammonia per mole of said diepoxide, said copolymer containing recurring amino groups and recurring divalent groups of open-epoxy ring hydroxylated allo-ocimene diepoxide, at least a major portion of the amino groups being secondary amino groups, said diepoxide groups containing on the average 2 hydroxyl groups and said resin having a molecular weight in the range of from 400 to 1200.

6. The method of producing allo-ocimene diepoxide–ammonia copolymer resins comprising reacting from 0.8–1.2 moles of ammonia per mole of allo-ocimene diepoxide under superatmospheric pressure and at an elevated temperature until such a copolymer resin is formed, the reaction mixture being heated to a temperature above 75° C. and being under an initial pressure above 50 pounds per square inch gauge.

7. The method claimed in claim 6 in which molar ratio of ammonia and diepoxide is 1:1.

8. The method claimed in claim 7 in which the ammonia is aqueous ammonia.

9. The method claimed in claim 6 in which the ammonia is aqueous ammonia.

10. The method of producing polymeric resins comprising mixing allo-ocimene diepoxide and aqueous ammonia containing about one mole of NH₃ per mole of diepoxide in a closed vessel, heating the reaction mixture to a temperature above 75° C. under an initial pressure above 50 pounds per square inch gauge and maintaining the reaction mixture under superatmospheric pressure and elevated temperature until the resulting resin has a molecular weight of 400 to 1200.

11. The method of producing polymeric resins as claimed in claim 10 in which the reaction mixture is heated to a temperature of about 98° C. under an initial pressure of about 80 pounds per square inch, gauge.

References Cited

Naves et al.: Chem. Abs. 51, (1957), p. 17833C.

JOSEPH L. SCHOFER, *Primary Examiner.*

H. WONG. *Assistant Examiner.*